United States Patent [19]

Ho et al.

[11] Patent Number: 5,307,002
[45] Date of Patent: Apr. 26, 1994

[54] IMPROVEMENTS IN BATTERY CHARGING CIRCUITS

[75] Inventors: Chun H. Ho; Wai T. Lou, both of Tsuen Wan, Hong Kong

[73] Assignee: Astec International, Ltd., Kowloon, Hong Kong

[21] Appl. No.: 710,824

[22] Filed: Jun. 5, 1991

[30] Foreign Application Priority Data

Jun. 6, 1990 [GB] United Kingdom ............ 9012578.2

[51] Int. Cl.$^5$ .................... H02J 7/04; H02J 7/16
[52] U.S. Cl. ................................. 320/39
[58] Field of Search ............. 320/5, 9, 19, 39, 13

[56] References Cited

U.S. PATENT DOCUMENTS

| | | |
|---|---|---|
| 3,576,487 | 4/1971 | Chase . |
| 3,621,359 | 11/1971 | Schnegg . |
| 4,563,628 | 1/1986 | Tietz et al. ............... 320/20 |
| 4,595,872 | 6/1986 | Ball ........................ 320/13 |
| 4,670,703 | 6/1987 | Williams ............... 320/39 X |
| 5,122,721 | 6/1992 | Okada et al. ........... 320/5 X |

FOREIGN PATENT DOCUMENTS

| | | |
|---|---|---|
| 0147241 | 7/1985 | European Pat. Off. . |
| 0181112 | 5/1986 | European Pat. Off. . |
| 1615626 | 8/1970 | Fed. Rep. of Germany . |
| 2539255 | 7/1984 | France . |

OTHER PUBLICATIONS

"Power Electronics in the Minicomputer Industry", William W. Burns, III, member, IEEE, 8078 *Proceedings of the I.E.E.E.*, 76 (1988) Apr., No. 4, New York, N.Y.

"Battery-Switching Circuit for Dual-Battery Systems" May, 1989, vol. 31, No. 12, pp. 319 and 320. IBM Technical Disclosure Bulletin.

*Primary Examiner*—Steven L. Stephan
*Assistant Examiner*—E. To
*Attorney, Agent, or Firm*—McCubbrey, Bartels, Meyer & Ward

[57] ABSTRACT

A battery charging circuit comprising means to supply a DC output from the mains supply for inter alia recharging a rechargeable battery, switch means in series with the battery across the DC output which are normally closed but which open from time to time to disconnect the battery from the DC output, battery voltage monitoring means for measuring the potential or emf of the battery at the time when the switch means are open, and means for determining a maximum potential and therefore fully charged state for the battery and decreasing the charging current from the DC output to the battery when a fully charged state is determined.

7 Claims, 3 Drawing Sheets

IMPROVEMENTS IN BATTERY CHARGING CIRCUITS

This invention relates to battery charging circuits.

BACKGROUND TO THE INVENTION

Portable electronic equipment such as laptop computers have storage batteries for powering them when they are used away from a mains supply. The batteries need to be charged, when a mains supply is available, to their maximum so that the maximum computing time is available when the laptop computer is used away from a mains supply.

Care of such batteries is important to ensure a long life and to ensure that they retain a high charge capacity. They should not be overcharged since this can reduce their capacity.

It is possible to monitor the degree of charge for a rechargeable battery by observing the potential of the battery over time as it is charged at a constant current. The potential increases with time up to the point where it becomes fully charged and then starts to reduce. Therefore as soon as the potential reaches a steady value and starts to decline, charging should be stopped. Such an arrangement is described in European Specification No 181112A. A problem arises, however, when recharging batteries in say a laptop computer where the same DC supply generated from the AC mains is used both to power the computer and to provide recharging current. Thus, when the computer is being operated at the same time and the battery is being charged, the output from the charging circuit can be constant but the current drawn by the computer will vary depending upon many factors such as the operation of disc drives. Therefore the remaining current which is available for recharging the batteries will not be constant. Since the potential across the battery varies with the recharging current, one cannot, therefore, avoid the possibility of false conclusions as to whether the battery has reached a maximum potential and so become fully charged if one merely monitors the battery potential without taking into account the charging current.

It is therefore an object of this invention to provide a battery charging circuit where this problem is avoided.

BRIEF SUMMARY OF THE INVENTION

According to the invention there is provided a circuit for simultaneously supplying a DC output to portable electronic equipment and for charging a battery associated with that equipment as an alternative power supply for that equipment, the circuit comprising supply means to supply a DC output from a mains supply, a battery to be recharged from that DC output, an output from the supply means for powering the portable electronic equipment either from the DC supply or from the battery if the DC output is not available because it is not powered by the mains supply, battery voltage monitoring means for measuring the potential or emf of the battery, and means for determining a maximum potential and therefore fully charged state for the battery, in which first switch means are provided in series with the battery, the switch means being normally closed but being repeatedly opened to disconnect the battery from the DC output, the monitoring means measuring the potential or emf of the battery at the time when the first switch means are open, and in which means are provided for decreasing the charging current from the DC output to the battery when a fully charged state is determined, so preventing overcharging of the battery.

In effect with such a circuit one can check the voltage across the battery at a constant current, which in the case of the circuit of the invention is zero current, and so one can accurately and positively detect a fully charged state. Such an arrangement is simple and efficient. When a fully charged state is detected then the charging rate can be reduced to a trickle charge just to keep the battery fully charged.

In contrast with the arrangement shown in European Specification No 181112A where the charging current itself is pulsed, the circuit of the invention can use a consistent charging current as is required to operate the portable electronic equipment but repeatedly isolates the battery from that current for a short period. During that period the emf of the battery is measured and the result will be a useable figure for determining a maximum potential and so a fully charged state because the measurement will always be at the same current level, i.e., zero current.

Second switch means can be provided which are normally conductive to allow the battery to provide power when there is no mains supply but are rendered non-conductive when there is a mains supply.

In one embodiment of the first invention, the switch means include a first switch in series with the battery and through which the charging current passes, and which is rendered non-conductive from time to time for short periods to enable the emf of the battery pack to be measured at zero current. Also, the second switch means include a second switch connected in parallel with the first switch, the second switch being normally conductive to allow the battery to provide power when there is no mains supply but being rendered non-conductive when there is a mains supply, so that the charging current passes through the first switch.

It is an advantage of this embodiment that the first switch can be positioned in an AC adaptor together with control circuitry for the first and second switches, and the second switch together with the battery pack can be positioned in apparatus such as a laptop computer to be powered by the battery Despite this only a minimum number of connecting wires, e.g., four, are required between the AC adaptor and the apparatus.

Another problem when recharging batteries concerns the charging rate or current. There is a maximum recommended charging current for each type of battery. It is possible that the DC supply could be charging a particular battery at too high a recharging current. We have found that according to a preferred embodiment of the invention it is possible to determine the charging current by providing in series with the first switch means a resistance of known value. In this way, one can measure the voltage drop across that resistance to determine the charging current thereby. Means are also being provided to adjust the DC charging current, e.g., reduce it if the charging circuit is too high.

In one simple embodiment, the first switch means can be an electronic switch such as a field effect transistor (FET), and then the inherent internal resistance of the FET can also serve as the resistance across which the voltage drop is measured to determine the charging current.

A charging circuit according to the invention can be used for recharging any form of rechargeable battery in any situation where a piece of electronic or electrical apparatus or equipment needs to be powered by such batteries from time to time. Simple examples of electrical apparatus are battery powered shavers and portable audio equipment whilst an example of typical portable electronic equipment is a laptop computer The circuit of the invention is particularly suited for use in the latter case since the circuit can be compact and simple and of high efficiency which is important to avoid waste heat production so that size can be kept to a minimum. In addition much of the circuit can be located in an adaptor which is attached to the laptop computer by a relatively few wires. This has advantages in that the space required in the computer for the present invention can be kept to a minimum, and even the size and weight of the charging adaptor can be kept low. This can be important since the user of a laptop computer will usually need to carry the adaptor anyhow so that it is available for recharging the batteries and powering the computer when a mains supply is accessible.

BRIEF DESCRIPTION OF THE DRAWINGS

A battery charging circuit according to the invention will now be described, by way of example, with reference to the accompanying drawings, in which.

DESCRIPTION OF THE PREFERRED EMBODIMENT

Figure 1:
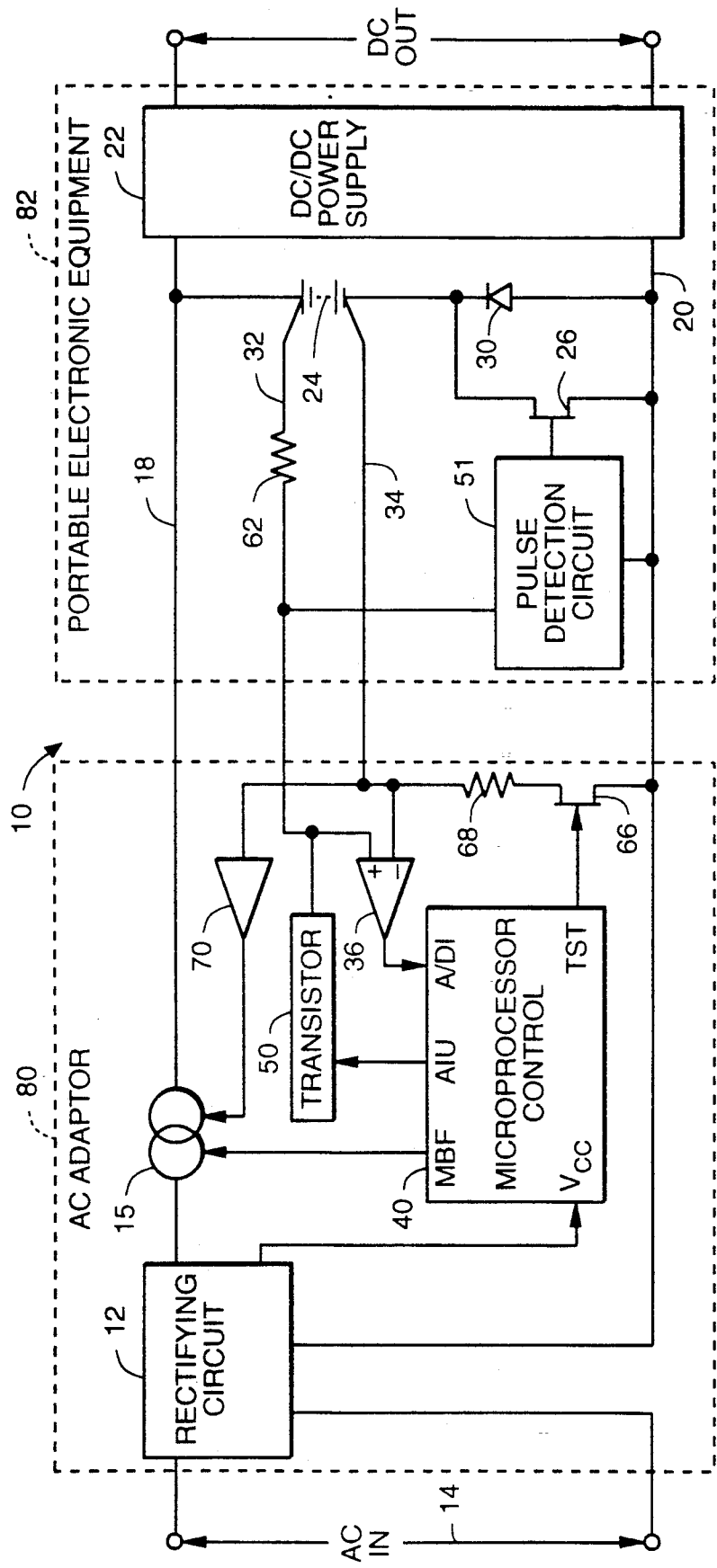
FIG. 1 is a circuit diagram of the circuit.

The charging circuit 10 shown in FIG. 1 comprises a conventional transforming and rectifying circuit 12. The circuit 12 receives an AC input across mains supply terminals 14 and provides a DC output to a current source 15. The latter can be a DC-DC convertor which is capable of providing a DC output voltage suitable both for powering a laptop computer and for recharging a battery pack. The output from the convertor is controllable to adjust the recharging current rate and is also capable of being changed to alter the recharging current rate to a trickle charging rate. The DC supply from the source 15 is provided between lines 18 and 20. The DC supply therefore supplies the input to a conventional DC-DC power supply 22 for the computer.

In the event of either lack of an AC mains supply 14 or its failure, a battery pack 24 comprising a number of rechargeable electrical storage batteries is provided across the lines 18 and 20 so that the supply 22 can receive an input and so still power the computer.

In series with the pack 24 is an electronic switch 26 comprising a FET. This switch 26 is normally conductive and so the pack 24, if charged, can immediately supply the necessary power to the supply 22 if the circuit 12 is not working.

In parallel with the switch 26 is a diode 30 which can be a separate diode but will normally be present as part of the FET. This diode is provided so that in the event that the switch 26 is open, as will be described below because the AC mains supply is functioning, and there is a failure of the AC mains, the power supply 22 can immediately draw power from the battery pack 24. The internal resistance of the diode 30 will to some extent reduce the efficiency of the power drawn but, as will be described below, the switch 26 will very quickly close if the mains supply fails and so current will only be drawn through the diode 30 for a short period of time which will not significantly affect the overall efficiency of the supply of power from the battery pack 24.

Across the battery pack are provided a pair of lines 32 and 34 for measuring the voltage of the pack to check its condition, i.e. state of charge. These lines lead to a differential amplifier 36 whose output goes to an analog to digital convertor within a microprocessor control 40.

A measure of battery condition can be determined by monitoring the voltage across the battery pack 24. As shown by the line 41 in FIG. 2, if one monitors this at a constant current over time, the battery voltage will reach a maximum. At that maximum point or point of inflection 42, the battery can be considered to be fully charged.

A problem in determining the emf of the battery pack 24 is that the recharging current through the pack 24 will depend upon the instantaneous current being drawn by the supply 22. Thus, if the current supplied by the source 15 is pre-set and the current drawn by the supply 22 varies according to the demand of the laptop computer. Therefore the charging current for the battery pack will be the balance of the current which will therefore also vary.

Figure 2:
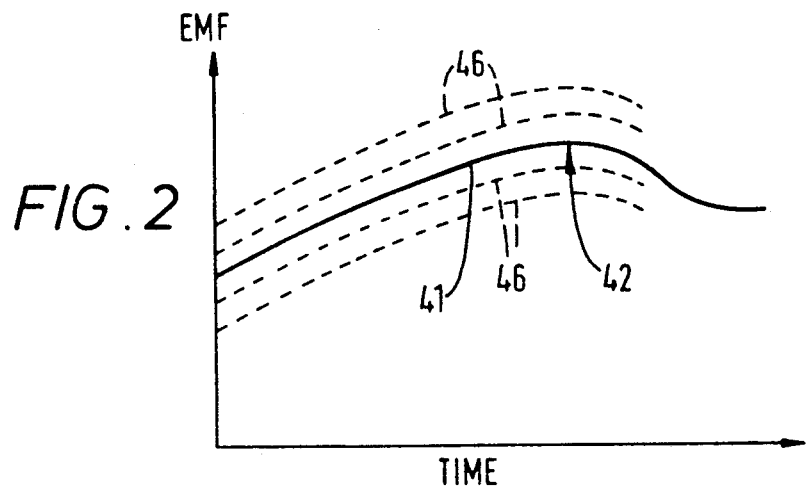
FIG. 2 is a graph demonstrating the charging voltage of a battery against time.

As shown by the dotted lines 46 in FIG. 2, there are a range of curves for determining the point 42 depending upon the recharging current Consequently, as this recharging current varies, the battery voltage will vary and can lead to a false conclusion as to a point of inflection 42 if one merely monitors the emf of the battery pack whilst ignoring the current.

According to the invention this problem is avoided by repeatedly interrupting the charging current and always measuring the voltage across the lines 32 and 34 at those times of zero charging current.

The switch 26 is open whenever there is an AC mains supply at the terminals 14. Thus, when there is, the circuit 12 powers the control 40 which produces on pin AIU a signal in the form of repeating pulses. These are high/low signals and they are fed to a high impedance circuit 50, e.g., a transistor, and the resulting pulses are fed to the line 32. In turn these pulses will be received by a pulse detecting circuit 51 whose output controls the base of the switch 26. As soon as pulses are received by the circuit 51, its output will bias the switch 26 into non-conduction so the switch 26 opens. Therefore all the while there is a satisfactory AC mains supply to the circuit 12, pulses will originate on pin AIU of the control and all the time pulses continue the switch 26 will be rendered non-conductive. However, once pulses cease, the circuit 51, after a short delay, e.g., within about 1 second, will also revert to a condition such that its output no longer biases the switch 26 and so the switch will then become conductive Thus, should the AC mains supply fail then very quickly the switch 26 will become conductive and allow the battery pack 24 to power the supply 22. As explained above, for the short period before the switch becomes conductive the diode 30 will allow power to be drawn immediately from the pack 24. Of course, if there is no AC mains supply, then the switch will be in its normal conductive state anyhow.

Figure 3A:
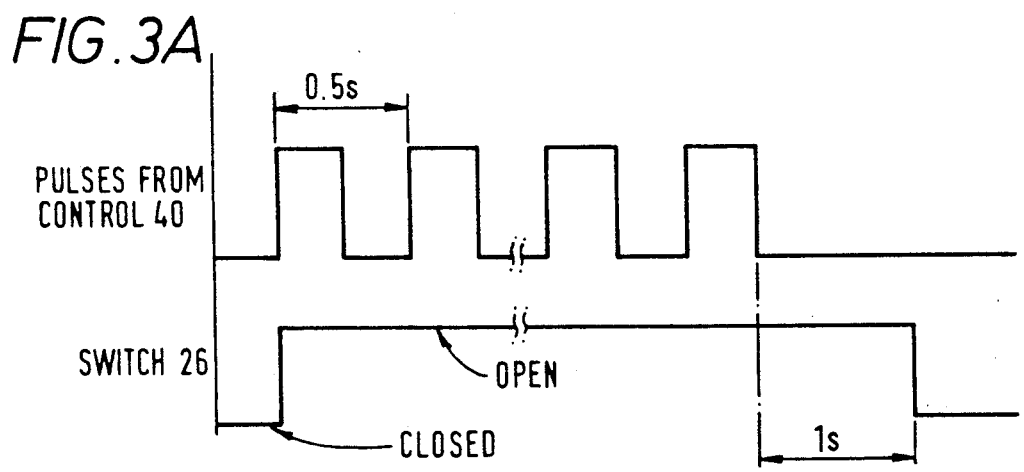
FIGS. 3A and 3B are timing charts.

Referring to FIG. 3A the pulses are of 0.25 second duration and repetition but they could be, for example, from 0.05 to 0.5 second in duration and repetition. As can be seen, as soon as the pulses start the switch 26 opens and it remains open all the time they continue.

However, about 1 second after the pulses cease, the switch 26 reverts to its normally closed condition.

The circuit 51 could be an RC circuit where the pulses charge a capacitor whose output biases the switch 26. Preferably, however, the circuit 51 is a mono-stable multivibrator and the receipt of the rising slope of the first pulse causes the multivibrator to change state and so bias the switch 26 into non-conduction. The multivibrator will then retain this state all the while the pulses continue, but once they cease, the multivibrator will, after a short delay, revert to its stable state where its output does not bias the base of the switch 26 into non-conduction.

The application of the pulses from circuit 50 to the line 32 does not affect the line 18 since a high resistance value resistor 62 is provided in the line 32 and the battery pack 24 acts as a large capacitance. Also the high input impedance of the circuit 51 isolates the line 32 when the voltage across the battery pack is to be measured as described below to ensure accurate measurement of the voltage of the pack 24.

Between the line 34 and the line 20 is another switch 66, again in the form of a FET. It is normally biased to an closed condition. It is in parallel with the switch 26 but can be a cheaper FET than the switch 26. Thus, if the switch 26 is of high quality, its resistance when conductive will be low so that the losses when the battery pack 24 is powering the circuit 22 will be low. Losses in the switch 66 are however of less importance since firstly it is positioned in the AC adaptor rather than the laptop computer and secondly is only operative during charging of the battery pack 24 when slight losses in the charging current are largely irrelevant.

When there is an AC mains supply across the terminals 14, the switch 26 will be open as described above and so the charging current will pass through the switch 66 along line 34.

In series with the switch 66 is a resistance 68 which can be a separate resistor or the inherent internal resistance of the switch 66. The charging current passing through the switch 66, will develop a potential across this resistance 68 which is proportional to the charging current. This potential is fed back through an amplifier 70 to form a control loop which will control the battery charging current from the current source 15 so that it does not exceed the maximum allowable current for the particular make of battery constituting the battery pack 24.

In order to check the voltage or emf across the battery pack 24 at zero current, the switch 66 must open regularly for a short period and during this period the emf is measured at zero current. Therefore TST pin of the control 40 will output a pulse of say 10 milliseconds duration to bias the base of the switch 66 to make it non-conductive for this period. At the end of this period, the voltage of the pack 24 is determined by the differential amplifier 36 whose output passes to the analog to digital convertor in the control 40.

Because the period when the switch 66 is open will be short, the voltage as measured across the pack 24 may not have had time to stabilize and so its value will be slightly dependant upon the rate of charging current. Therefore in assessing the voltage measured, the control 40 may weight the voltage detected by a preset amount dependant upon the charging current which has been detected. This adjustment can be achieved by some digital filtering in the software of the control 40.

Figure 3B:
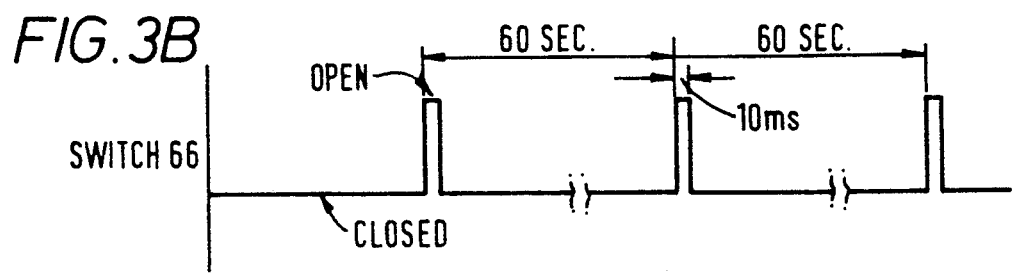

FIG. 3B shows the timing of the signal to open and close the switch 66 and shows, for example, the cycle of the opening and closing of the switch 66 every 60 seconds. This cycle is preferably repeated every 25 to 60 seconds all the time that there is a satisfactory AC mains supply across the terminals 14.

Once a battery fully charged condition is detected by the control 40, its MBF pin will be activated and this will supply a signal to the current source 15 to produce a change from rapid charging current output to the pack 24, e.g., a charging level of 1C, 1C being a full capacity charge rate within one hour, to a tickle charge level, e.g., a charging level of 0.03C. In this way the battery will be kept fully charged and ready for immediate use.

Figure 4:
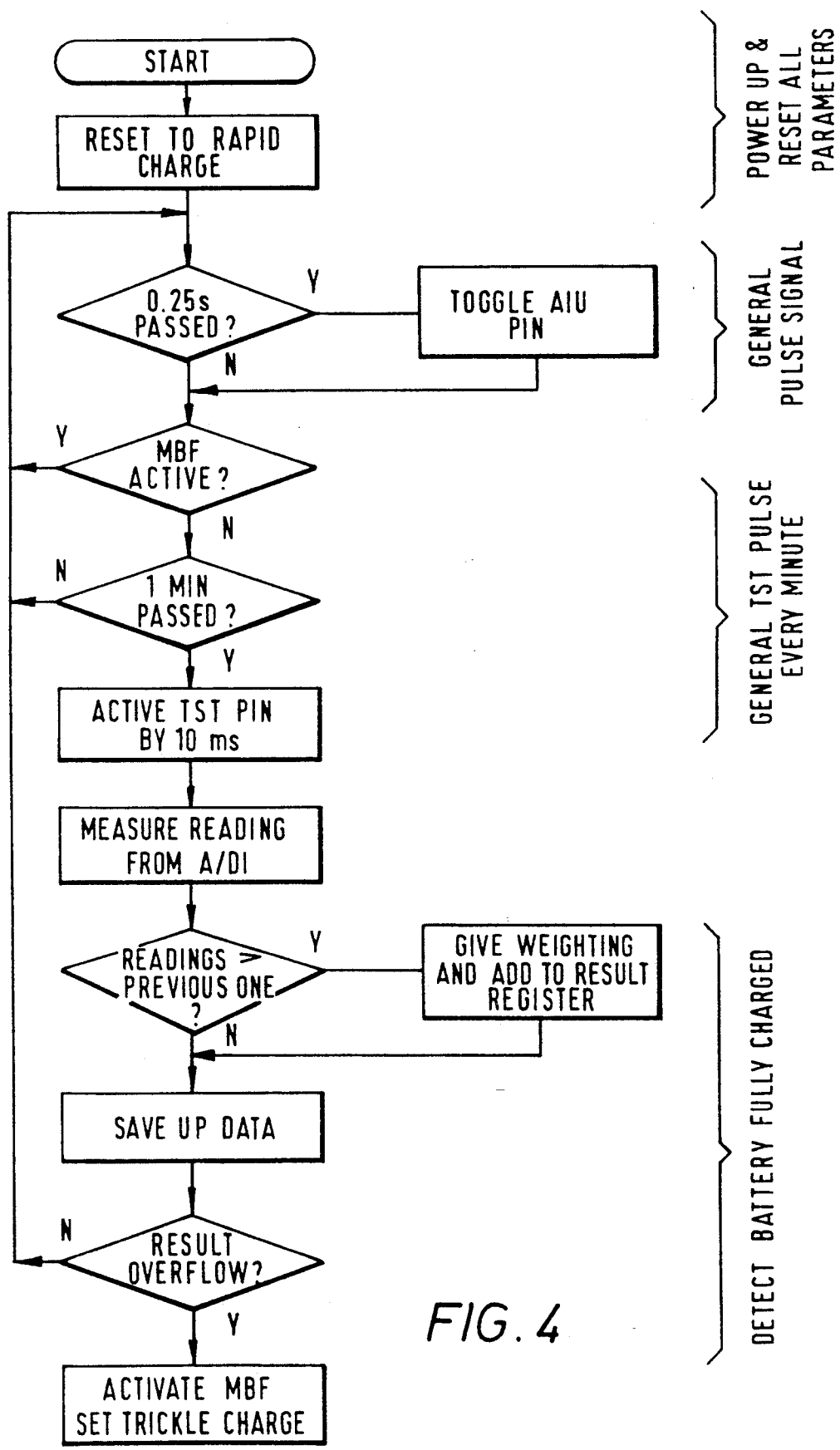
FIG. 4 is a software chart illustrating the control of the circuit.

FIG. 4 is a flow diagram of the main steps in the software program for the control 40.

It will be seen from FIG. 1, that the circuit is preferably in two parts 80 and 82. The part 80 constitutes an AC adaptor to which the mains supply is connected and this can contain many of the components of the circuit 10. The remaining part 82 will be positioned within a piece of portable electronic equipment, e.g., laptop computer and since this is only a small part of the circuit 10 this is advantageous because size and weight in the laptop computer are at a premium. Further it will be noted that it is possible to connect the parts 80 and 82 solely by four conductors forming the lines 18, 20, 32 and 34. This is advantageous since it would be undesirable to have too many conductors bridging the parts 80 and 82 which are positioned in different pieces of apparatus.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. An AC adaptor, separate from and adapted to be connected to portable electronic equipment, for supplying a DC output to power the equipment and for charging a battery used to provide the backup power to the equipment when an AC mains supply is not available to power the AC adaptor, the adaptor comprising:

supply means for converting the AC mains supply to a DC supply;

current control means connected to said supply means for sensing and controlling the current supplied to the battery and to the equipment;

battery voltage monitoring means for measuring the potential of the battery;

means responsive to said monitoring means for determining a maximum said potential to indicate a fully charged state of the battery, the current control means being responsive to said determining means to reduce the current supplied to the battery when the fully charged state is determined;

means for sensing connection of the adaptor to the AC mains supply and for electrically disconnecting the battery from the equipment in response thereto; and means for connecting the adaptor to the equipment;

wherein said battery voltage monitoring means comprises switch means connected in series with the battery and switch control means for repeatedly opening said switch means to interrupt the charging current to the battery, the monitoring means measuring said potential when said switch means is open.

2. An adaptor as claimed in claim 1 further comprising a resistive element in series with said switch means and wherein the current control means includes means for determining the voltage across said resistive element and the switch means to determine the current supplied to the battery.

3. An adaptor as claimed in claim 2 wherein the switch means comprises a field effect transistor.

4. An adaptor as claimed in claim 1 wherein the connector means provides a connection to the equipment having no more than four wires.

5. In combination an adaptor as claimed in claim 1 and portable electronic equipment having a battery associated therewith, the adaptor being connectable to the equipment to power the equipment from a mains supply and to charge the battery.

6. In combination an adaptor as claimed in claim 5 wherein said means for disconnecting the battery includes means for generating a switch control signal and in which the equipment further comprises switch means for disconnecting the battery from the equipment in response to said switch control signal from the adaptor.

7. A combination as claim in claim 6 wherein the connection means connects said switch means to the adaptor to receive said control signal.

* * * * *